United States Patent [19]

Ruitberg et al.

[11] Patent Number: 4,517,472
[45] Date of Patent: May 14, 1985

[54] HIGH VOLTAGE POWER SUPPLY

[75] Inventors: Arthur P. Ruitberg, Germantown; Kenneth M. Young, Lothian, both of Md.

[73] Assignee: The United States of America as represented by the Administrator of the National Aeronautics and Space Administration, Washington, D.C.

[21] Appl. No.: 511,362

[22] Filed: Jul. 6, 1983

[51] Int. Cl.³ .............................. H02J 1/10; H02J 3/46
[52] U.S. Cl. ........................................ 307/82; 363/19; 363/23; 363/61; 363/100; 363/71; 378/104; 378/112
[58] Field of Search ........................ 307/20, 24, 31, 33, 307/45, 46, 52, 60, 82, 83, 84; 363/23, 25, 26, 61, 100, 134, 71; 378/101, 104, 111

[56] References Cited

U.S. PATENT DOCUMENTS

| | | | |
|---|---|---|---|
| 3,412,311 | 11/1968 | Siedband | 321/2 |
| 3,523,255 | 8/1970 | Rhyne et al. | 363/23 |
| 3,660,751 | 5/1972 | Bullinga | 321/2 |
| 3,843,919 | 10/1974 | Yamamura | 321/2 |
| 3,869,659 | 3/1975 | Doong | 321/15 |
| 4,142,101 | 2/1979 | Yin | 250/363 |
| 4,251,857 | 2/1981 | Shelly | 363/26 |
| 4,259,581 | 3/1981 | Csontos | 250/402 |
| 4,298,926 | 11/1981 | Black | 363/17 |

OTHER PUBLICATIONS

Transistor Converters for the Generation of High-Voltage Low-Current D.C. Supplies, C. J. Yarrow, IEE Paper No. 2929E, May, 1959.

Reference Data for Radio Engineers, 6th ed., H. W. Sams & Co., pp. 14-6 through 14-8, 1977.

Primary Examiner—Peter S. Wong
Assistant Examiner—Jeffrey Sterrett
Attorney, Agent, or Firm—John O. Tresansky; John R. Manning; Sol Sheinbein

[57] ABSTRACT

A high voltage power supply is formed by three discrete circuits (12, 14, 16) energized by a battery (18) to provide a plurality of concurrent output signals floating at a high output voltage on the order of several tens of kilovolts. Each circuit has a regulator stage (20, 28, 36). In the first two circuits, the regulator stages are pulse width modulated and include adjustable resistances (R1, R2) for varying the duty cycles of pulse trains provided to corresponding oscillator stages while the third regulator stage includes an adjustable resistance (R3) for varying the amplitude of a steady signal provided to a third oscillator stage. In the first circuit, the oscillator (22), formed by a constant current drive network and a tuned resonant network including a step-up transformer (46), is coupled to a second step-up transformer (24) which, in turn, supplies an amplified sinusoidal signal to a parallel pair of complementary poled rectifying, voltage multiplier stages (76, 76') to generate the high output voltage. Each of the other two circuits include oscillator drive stages (30, 38) which, together with isolation transformers (32, 40) provide output signals floating at the high output voltage.

18 Claims, 12 Drawing Figures

HIGH VOLTAGE POWER SUPPLY

ORIGIN OF THE INVENTION

The invention described herein was made by employees of the United States Government and may be manufactured and used by or for governmental purposes without the payment of any royalties thereon or therefor.

TECHNICAL FIELD

This invention relates to electrical power supplies and, more particularly, to a power supply for providing a plurality of high voltage output signals.

BACKGROUND ART

High voltage power supplies have typically been low frequency networks characterized principally by their mass, bulk and relative inefficiency. Recent advances in such fields as diagnostic x-ray devices (e.g., the Low Intensity X-ray and Gamma-ray Imaging Device disclosed in U.S. Pat. No. 4,142,101) have established a demand for portable, battery driven power supplies able to deliver a plurality of regulated, static output voltages on the order of tens of kilowatts for periods of several hours. The operational characteristics of such devices usually require that each potential furnished by a power supply be separately adjustable.

Currently available battery operated power supplies typically have a push-pull inverter stage coupled across a center tapped primary winding of a saturable core step-up transformer. When the core saturates, a potential is induced in a second winding which causes the inverter stage to reverse its mode of conduction. The frequency of operation of the inverter stage is principally controlled by the saturation time of the transformer. Often in such configurations, a feed-back potential is derived from a secondary winding and applied to control the amplitude of the voltage applied by the inverter stage to the transformer. A voltage multiplier stage driven by another secondary winding is used in such configurations to provide an increased output voltage while a voltage divider stage converts the output from the multiplier stage into a plurality of different output signals.

The use of voltage induced in the secondary winding, as practiced by these prior art power supplies for switching the conduction mode of the inverter stage causes the output current provided by the transformer's secondary winding to be generated as a series of square waves pulsing at the same frequency at which the inverter is being switched. In effect, such power supplies rely upon the transformer to establish the switching frequency of the inverter stage; harmonics of the switching frequency are, therefore, included in any signal appearing across the secondary windings of the transformer. The presence of such harmonics introduces substantial undesired ripple into the output signals provided by the power supply.

Moreover, the use of a divider stage to provide multiple output signals prevents independent adjustment of the output potentials. Furthermore, the presence of high current spikes occurring during changes in core saturation and the sudden change in the amplitude of current which occurs at each transition between pulses causes a reflected ripple current which, in turn, causes electromagnetic noise that detrimentally interferes with the operation of any neighboring electrical equipment. Also, the saturable core of the transformer is a significant source of energy loss, a factor which renders these configurations unsuitable for use in battery powered, high potential supply sources. The presence of such ripple renders this type of power supply unsuitable for use in applications where both a constant high voltage and a well regulated but much lower amplitude voltage floating at the high voltage are required as output signals because the ripple from the high voltage stage destroys the regulation of the low voltage stage.

Attempts to improve the regulation of output potentials have included efforts to compensate for variations in output voltages due to causes such as changes in loading. Such efforts typically rely upon a pulse width modulator to regulate a chopping transistor driving the center tap of the primary winding. In these configurations a feedback loop, such as a current sensing stage is often used to provide an analog signal for controlling the duty cycle of the modulator in proportion to changes in the loading of the transformer's secondary winding. This type of power supply is not suitable for providing high voltages, however, because of a lack of electrical insulation between the input and output sides of the circuit. Moreover, such power supplies require synchronization between the pulse width modulator and the transformer, a feature which restricts the range over which the duty cycle of the modulator may be varied to compensate for changes in loading of the power supply.

Other power supplies have attempted to obtain well regulated output signals by using a separate control circuit having ancillary oscillator and base drive stages to regulate switching of transistors driving a transformer in a power converting stage. The ancillary circuits themselves require a power supply. The presence of such ancillary circuits and their individual power supply undesirably adds to the complexity and physical bulk of the overall design. Moreover, the control circuit in such power supplies is driven by a feedback signal obtained directly from the output terminals of the power supply, a feature which prevents insulation of the control circuit from the output voltages and, therefore, renders these power supplies unsuitable for generation of high output voltages.

Recent efforts to enable a power supply to provide high voltages suitable for operation of x-ray tubes have included a variety of capacitive discharge circuits. One power supply, for example, included a motor driven, rotating commutator providing sequential discharge of individual capacitors through the primary winding of a step-up transformer. Although capacitive discharge type power supplies are adequate for providing high voltage impulses of short duration, without extensive, power consuming filtering, the transient phenomenon accompanying discharge renders such power supplies unsuitable for providing well regulated output voltages. Additionally, the presence of motor driven, rotating communators makes such power supplies less than ideal for use in small, portable devices.

STATEMENT OF INVENTION

Accordingly, it is an object of the present invention to provide an improved high voltage power supply.

It is another object to provide a power supply able to continuously furnish a well regulated output potential on the order of tens of kilovolts.

It is a further object to provide a battery powered power supply able to continuously furnish a well regulated output potential on the order of tens of kilovolts.

It is yet another object to provide a power supply providing a plurality of independently adjustable, high voltage output potentials.

It is also an object to provide a power supply providing a plurality of well regulated, high voltage outputs.

It is a still further object to provide a portable, battery powered power supply able to continuously furnish a well regulated output potential on the order of tens of kilovolts.

These and other objects are achieved with a high voltage power supply having a plurality of circuits coupled in parallel between an unidirectional energy source and a common output terminal, and providing a plurality of concurrent output signals. Two of the circuits include modulated regulator stages driving corresponding oscillator stages with pulse trains having particular repetition rates. A third one of the circuits has a regulator stage controlling the flow of energy between the energy source and a third oscillator stage. Each of the oscillator stages includes a transformer forming part of a tuned network and providing a sinusoidal signal at the frequency of the tuned network across secondary windings coupled on one side to the common output terminal. One of the first two circuits also includes a step-up transformer supplying an amplified corresponding one of the sinusoidal signals to a parallel pair of complementary poled rectifying, voltage multiplier stages which, in turn, provide a unidirectional output voltage having an amplitude on the order of several tens of kilovolts between the common output terminal and a network reference. The sinusoidal signal provided by the second of the two circuits floats at the amplitude of the unidirectional output voltage while the third circuit includes a rectifier stage converting the corresponding sinusoidal signal into a unidirectional signal having an amplitude varying slightly from that of the unidirectional output voltage.

BRIEF DESCRIPTION OF THE DRAWINGS

A more complete appreciation of this invention and many of the attendant advantages thereof will be readily apparent as the same becomes better understood by reference to the following detailed description in which like numbers indicate the same or similar components, and wherein.

DETAILED DESCRIPTION OF THE INVENTION

Figure 1:
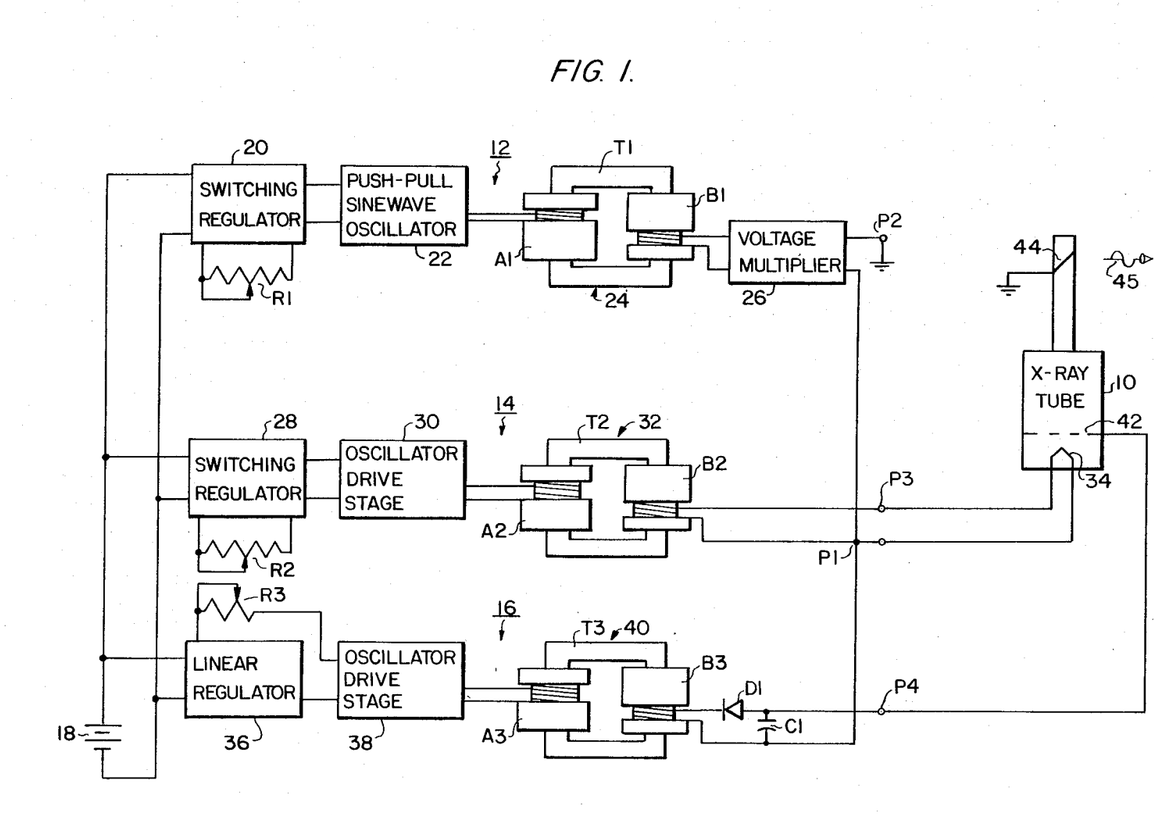
FIG. 1 is a block diagram showing an embodiment of the present invention arranged to provide power to a typical load.

Refer now to the drawings and, in particular, to FIG. 1 which illustrates the interconnections between the various stages of a power supply for providing several independently adjustable output potentials to such devices as a triode type x-ray tube 10. The power supply is formed by three multi-stage circuits 12, 14, 16 coupled in parallel between a direct current source such as a battery 18, and a common output terminal P1.

Circuit 12 includes a switching regulator stage 20 having its input coupled across battery 18 for driving a sine wave oscillator 22. An adjustable resistance, such as a rheostat, R1 is included in regulator stage 20 to adjust its duty cycle. The output of oscillator 22 is applied across a primary winding of a step-up isolation transformer 24. A secondary winding of transformer 24 is coupled across a voltage multiplier 26 which furnishes a negative potential difference on the order of several tens of kilovolts between output terminals P1, P2. Output terminal P1 is common to all three circuits while terminal P2 is connected to a reference potential such as a network ground.

Circuit 14 has a switching regulator stage 28 coupled across battery 18 and a rheostat R2 providing adjustment of its duty cycle. Regulator stage 28 provides power to a push-pull drive stage 30 which, in turn, has its output applied across a primary winding of an isolation transformer 32 which, in turn, develops an alternating voltage on its secondary winding. One side of the secondary winding of transformer 32 is coupled to common output terminal P1 while the other side thereof forms output terminal P3.

Circuit 16 includes a linear regulator stage 36 coupled across battery 18 for providing power to oscillator drive stage 38. Regulator stage 36 operates as a linear resistance which consumes power from oscillator 38 to control the amplitude of generated signals in response to variations in output voltage sensed by the regulator. As adjustable resistance R3 is provided for the regulator. The output of drive stage 38 is applied across a primary winding of an isolation transformer 40. A secondary winding of transformer 40 has one leg coupled to common output terminal P1 and its other leg coupled to terminal P4. This winding develops an output signal which is rectified by a diode D1 and filtered by a capacitance C1 to provide a low amplitude direct voltage between terminals P1 and P4.

Transformers 24, 32 and 40 are compact, high voltage isolation transformers which are disclosed in a copending application entitled "High Voltage Isolation Transformer" filed on June 21, 1983, and assigned Ser. No. 506,477; also identified as NASA Case No. GSC 12,817-1.

In the power supply of FIG. 1, circuit 12 is designed to provide a well regulated voltage having an amplitude on the order of several tens of kilovolts (e.g., $-80$ kV) between terminals P1, P2 while the other circuits 14, 16 are designed to provide output signals at voltages differing from the voltage occurring between terminals P1, P2 by less than one kilovolt. In the exemplary application shown, terminals P1, P2 are connected to establish a potential difference between a filament 34 and an anode 44 of x-ray tube 10. Output terminals P1 and P3 are coupled across filament 34 while terminal P4 is coupled to a grid 42 of x-ray tube 10. The commonality of output terminal P1 to all three circuits assures that output signals provided by circuits 14, 16 float at a high voltage near the level of the constant potential difference between terminals P1, P2. Consequently, the signal applied to filament 34 by circuit 14 has a direct current potential of several tens of kilovolts (e.g., $-80$ kV) with respect to terminal P2. The power supply also applies a direct voltage to grid 42 which has an amplitude varying between the sum and difference of the high voltage appearing between terminals P1, P2 and the potential supplied by circuit 16 between terminals P1, P4. The potential difference between terminals P3, P4 is designed to be slightly more negative (e.g., 80 to 150 volts) than the potential applied across filament 34 to enable grid 42 to repel and thereby focus electrons emitted by filament 34 in to a stream directed toward anode 44, thus causing anode 44 to emit an x-ray beam 45. Anode 44 is coupled to the network reference potential.

Figure 2:
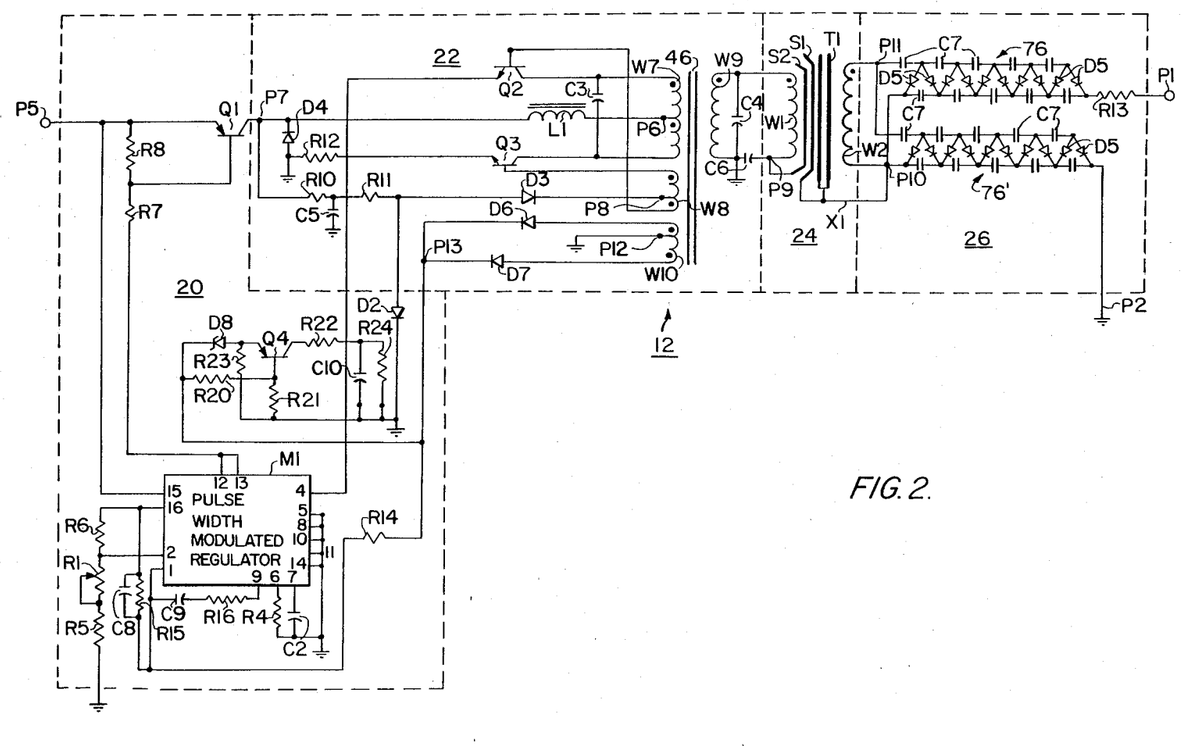
FIG. 2 is an electrical schematic diagram of a high voltage circuit included in the embodiment of FIG. 1.
Figure 3A:
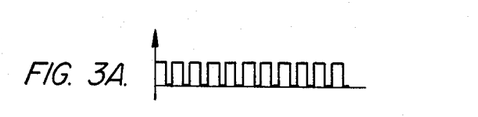
FIGS. 3A through 3B illustrate waveforms of signals occurring at several points throughout the high voltage circuit shown in FIG. 2.

FIG. 2 illustrates in detail the several stages of high voltage circuit 12. Regulator stage 20 is formed with a pulse width modulating regulator M1, such as a commercially available sixteen pin SG 1524 integrated circuit chip manufactured by Silicon General Company. Resistance R4 and capacitance C2 are coupled between ports 6 and 7 of regulator M1 and a reference potential, to establish the internal pulse repetition frequency, $f_1$, of regulator stage 20. Adjustable resistance R1, in conjunction with fixed resistances R5, R6, form a voltage divider establishing an adjustable reference voltage (across resistances R5 and R1) and a fixed reference voltage (across resistance R6) to ports 2 and 16, respectively, of regulator M1 for establishing the duty cycle of regulator M1. Power is supplied directly to regulator stage 20 via input terminal P5 to port 15 of regulator M1 and to the remainder of circuit 12 via the emitter and collector electrodes of a transistor Q1. The base of transistor Q1 is biased by resistances R7, R8 and connected, via resistance R7, to output ports 12, 13 of regulator M1. This enables regulator M1 to establish the bias voltage applied to the base of transistor Q1 and thereby control whether transistor Q1 is in a conducting or a non-conducting mode so that while regulator M1 is in one state of its duty cycle, transistor Q1 is held in a conducting mode, thereby allowing current to flow from terminal P5 to the center taps P6, P8 of primary windings W7, W8, respectively, of a step-up transformer 46 via the emitter and collector electrodes. While regulator M1 is in the other state of its duty cycle, the bias voltage applied by regulator M1 to the base of transistor Q1 holds the transistor in a non-conducting mode, thereby interrupting the flow of current between terminal P5 and transformer 46. Each output port of modulator M1 provides regulation for fifty percent of a cycle. Coupling the base electrode of transistor Q1 to both output ports enables regulator M1 to adjust the modulation of the transistor between about five and ninety-five percent of each cycle. Transistor Q1 is, in effect, a chopper which provides a continuous train of direct current pulses to an inductance L1 and center tap P6 of winding W7 of transformer 46. The width and the frequency of the pulses are controlled by the duty cycle and frequency, $f_1$, respectively, of regulator M1. The waveform of the train of voltage pulses appearing at node P7 is shown in FIG. 3A. With a battery 18 providing a direct voltage of about fifteen volts to terminal P5, and regulator M1 set to operate with a duty cycle of about fifty percent, the average voltage appearing at node P7 will be approximately seven and one-half volts.

Figure 3B:
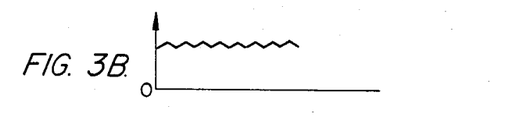

A constant current sinewave oscillator 22 is formed by transformer 46, a pair of transistors Q2, Q3 coupled in a push-pull configuration between the two center tapped windings W7, W8 of transformer 46, and inductance L1. Inductance L1 is coupled between the collector electrode of transistor Q1 and center tap P6 of primary winding W7. The energy stored in inductance L1 maintains a continuous current flow through winding W7 while transistor Q1 is held in a non-conducting mode. The waveform shown in FIG. 3B represents the amplitude of current flowing through inductance L1. The base electrodes of transistors Q2, Q3 are coupled across winding W8. Bias voltages are applied to the base electrodes by the two sections of winding W8 through a potential applied to center tap P8 from current flowing from node P7, through a series of resistances R10, R11 and a diode D3 which restricts the current flow through center tap P8 to a single direction. During each cycle of the oscillator, one of transistors Q2, Q3 is held in a non-conducting mode by the amplitude of the potential applied to its base electrode while the other transistor is held in a conducting mode with current flowing through inductance L1 and across its collector and emitter electrodes via center tap P6 and a corresponding section of winding W7, and through the collector and emitter junction of either transistor Q2 or Q3. Resistance R12 establishes a potential between the coupled emitter electrodes of transistors Q2, Q3 and the network reference potential for current sensing while a diode D4 assures a constant current flow through inductance L1 when transistor Q1 is in a conducting mode.

Figure 3C:
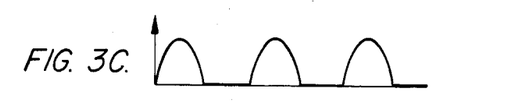
Figure 3D:
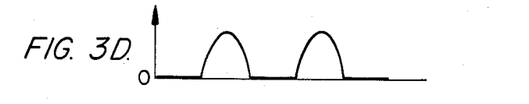

A capacitance C3 is coupled across primary winding W7 while a capacitance C4 is coupled across a secondary winding W9. Together, capacitances C3, C4 and transformer 46 form an equivalent tuned resonant circuit which establishes a resonant frequency, $f_2$, for oscillator stage 22. As represented by FIGS. 3C and 3D, the amplitudes of voltages appearing across the collector electrodes of transistors Q2, Q3, respectively, each have half cycle sinusoidal waveforms with a frequency equal to $f_2$. The turns ratio between windings W7 and W9 is selected to provide a step-up in the voltage across winding W9. A turns ratio of about 1:14.5, for example, will provide a peak-to-peak voltage across winding W9 of approximately one hundred and ten volts.

Figure 3E:
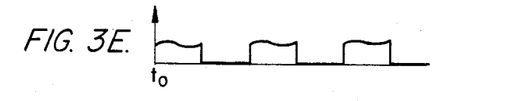

Switching between the conducting and non-conducting modes of transistors Q2, Q3 occurs at twice the resonant frequency $f_2$ (i.e., once every one-half cycle) established by capacitors C3, C4 and transformer 46, and is implemented by the bias voltages applied by winding W8 to the base electrodes of each of the transistors. Voltages induced across winding W8 exhibit the same sinusoidal waveform (albeit with smaller amplitudes) as voltages occurring across the collector electrodes. Windings W7 and W8 are wound in a flux additive direction. Consequently, as the voltage on one collector electrode of transistors Q2, Q3 falls to zero due to cycling of the equivalent resonant circuit, a reversal of current occurs through winding W8, thereby causing simultaneous shifts in the bias voltages induced across winding W8 applied to the base electrodes. These shifts cause the transistor which has a mininum collector voltage to be biased in a conducting mode during a one-half cycle while the other transistor is biased in a non-conducting mode. Assuming, for purposes of explanation, that voltage on the collector of transistor Q3 reaches a minimum at time $t_o$, as is shown in FIG. 3D, then the simultaneous shift in the bias voltages places transistor Q3 into its conduction mode and, for one-half of a cycle, allows current to flow through inductance L1, one part of winding W7, across the collector and emitter electrodes of transistor Q3, and through resistance R12 to the network reference potential. The amplitude of current flowing through the collector electrode of transistor Q3 is represented by the waveform shown in FIG. 3E.

Capacitance C5 is coupled between resistances R10, R11 and the network reference potential to provide filtering of transient currents caused by the transition of transistor Q1 between its conducting and non-conducting modes.

Transformer 24 exhibits a high degree of leakage current due to a large number of closely spaced turns in its primary and secondary windings. A capacitance C6 is serially connected between the network reference potential and one end of primary winding W1 of transformer 24 to provide series tuning with the leakage inductance and thereby assure that at the oscillator frequency, the series combination of the leakage inductance and capacitance C6 form an equivalent zero net impedance.

Figure 3F:
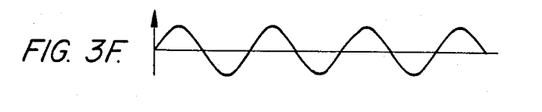
Figure 3G:
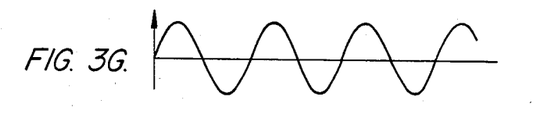

FIG. 3F represents the sinusoidally alternating voltage applied by secondary winding W9 of transformer 46 to primary winding W1 of transformer 24. A sinusoidally alternating voltage of higher amplitude, represented by the waveform shown in FIG. 3G, is developed by transformer action across secondary winding W2. Transformer 24 (to be discussed in greater detail hereinafter) is designed to provide across winding W2 a substantial voltage increase over the voltage applied across winding W1. A turns ratio of approximately 1:92, for example, will produce a peak-to-peak voltage of about ten kilovolts between terminals P11, P10.

Figure 3H:
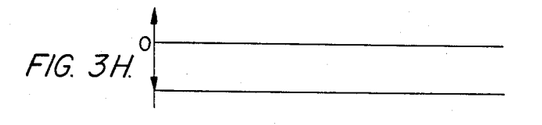

Secondary winding W2 is connected across voltage multiplier 26 which is formed by a complementary pair of oppositely poled, high order voltage multiplier stages 76, 76'. Each of these stages has five cascaded units formed by pairs of capacitances C7 and diodes D5. One side of each one of multiplication stages 76, 76' are coupled together, in parallel, across terminals P10, P11 of secondary winding W2. The diodes D5 in each stage 76, 76' are arranged with opposite polarities, thereby causing the stages to exhibit opposite polarities, thus assuring that the net potential across the two multiplier stages are substantially equal and additive. Together, the ten units of parallel multiplication stages 76, 76' provide full wave rectification, a high degree of filtering, and an approximately eight-fold increase in the peak-to-peak potential across terminals P11, P10 of secondary winding W2. Accordingly, a ten kilovolt difference across terminals P11, P10 will result in a constant forty kilovolt difference across terminals P11 and P2 and a constant eighty kilovolt difference across terminals P1, P2. FIG. 3H represents the waveform of the potential difference between terminals P1, P2. A resistance R13 provides a low value load to limit excess current flow in the event that terminal P1 becomes short circuited to the network reference potential and thereby protect the multiplier stage from damage. To avoid arcing or corona (due to causes such as humidity) between individual components in multiplier 26 or between multiplier 26 and transformer 24, both multiplier 26 and transformer are potted in a compound having a high breakdown strength such as Conap EN11, a compound commercially available from the Conap Company, which has a breakdown strength of approximately six hundred volts per mil.

Transformer 46 also has a winding W10 with a center tap P12 connected to the network reference potential. A pair of diodes D6, D7 are coupled with common cathodes to opposite ends of winding W10 between center tap P12 and a junction P13 to provide full wave rectification of signals developed across winding W10. The voltage amplitude of those signals varies in response to changes in the voltage developed between terminals P10, P11 and is used, therefore, to provide a feedback signal for governing the duty cycle of regulator M1 set by resistance R1. The feedback signal is taken from terminal P13 and applied via a current limiting resistance R14 directly to port 1 of regulator M1 and, via filters formed by a resistance R15 coupled in parallel with a capacitance C8, and by a capacitance C9 serially coupled to a resistance R16, to ports 9 and 16 of regulator M1. A change in the voltage developed between terminals P10, P11 is reflected by transformers 24, 46 in the amplitude of the voltage occurring across winding W10 which, in turn, causes a change in the amplitude of current in the feedback signal applied via resistance R14 to regulator M1. The feedback signal applied directly to one port of regulator M1 effectively creates an offset voltage to a constant five volt signal supplied by port 16 of regulator M1; the offset voltage varies linearly with changes in the feedback signal. The potential difference between the reference signal and the feedback signal applied to port 9 of regulator M1 is amplified internally by regulator M1, thereby enabling regulator M1 to automatically respond to changes in the voltage across terminals P10, P11 as those changes are reflected back to winding W10, by internally varying the length of its duty cycle, thus causing a corresponding change in the average amplitude of the signal applied to center tap P6 and, ultimately, in the voltage developed across terminals P1, P2.

The feedback voltage occurring at terminal P13 is also applied directly to the anode of a zener diode D8 and, via resistances R20, R21, to bias the base electrode of a transistor Q4. The cathode of diode D8 is coupled, via the emitter electrode of transistor Q4 and a resistance R22, to the gate electrode of silicon controlled rectifier D2, and, via a resistance R23, to the network reference potential. A voltage between node P13 and the emitter electrode of transistor Q4 which exceeds the zener voltage (i.e., an over-voltage) of diode D8 will drive the diode into a reverse conduction mode thereby causing a drop in the potential across the collector and emitter electrodes of transistor Q4. This drop, in turn, causes a drop in the voltage on the gate electrode of zener diode D2, thereby latching diode D2 into conduction and effectively shunting the base drive of transistors Q2, Q3 to the network reference potential. Consequently, transistors Q2, Q3 are held in a non-conduction mode, thus preventing operation of the oscillator stage and consequential failure of circuit 12 due to such causes as, for example, the occurrence of a short circuit condition between terminals P1, P2, thereby providing short circuit protection for circuit 12. A capacitance C10 in parallel with a resistance R24 forms a filter connected between the gate electrode of rectifier D2 and the network reference potential to prevent transient voltages such as those due to electro-magnetic interference, from controlling the gate electrode.

Figure 4:
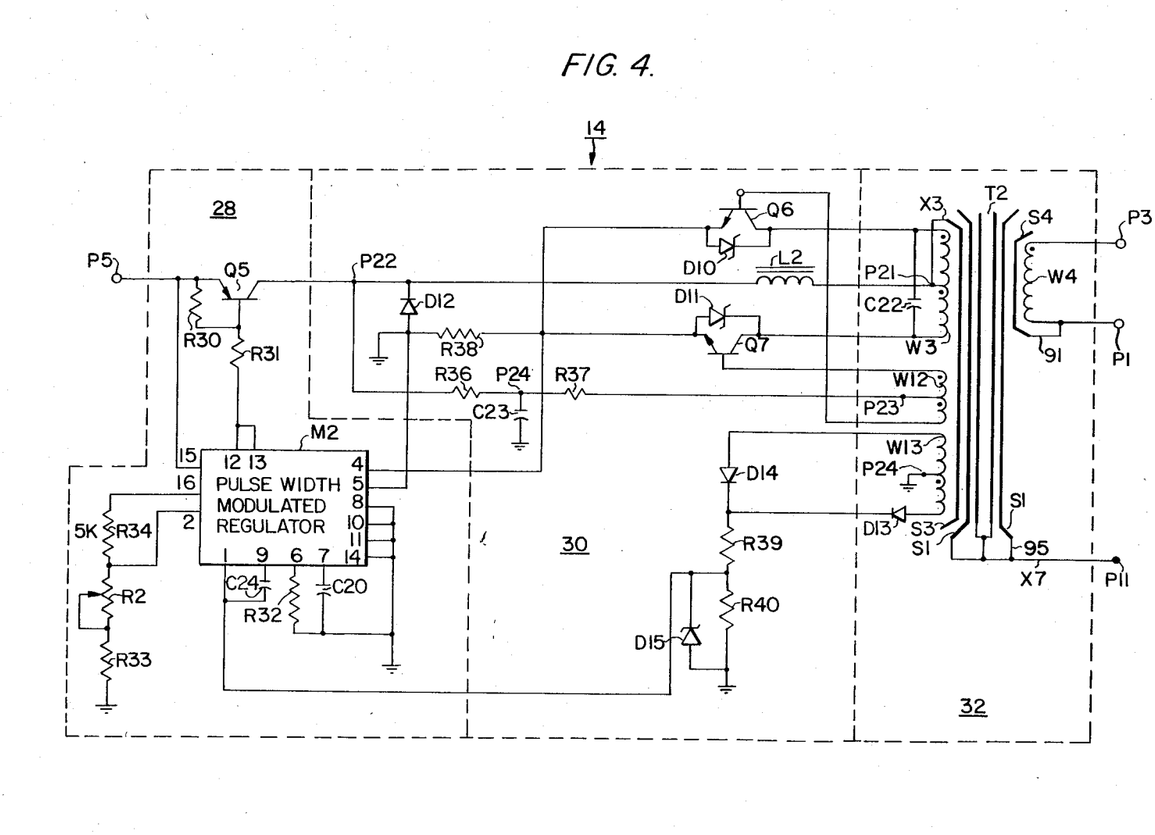
FIG. 4 is an electrical schematic diagram of a second circuit included in the embodiment of FIG. 1.

As shown in FIG. 4, circuit 14 also includes a pulse width modulated regulator M2 (which also may be a sixteen pin SG 1524 integrated circuit chip) having a port 15 coupled directly to terminal P5. Resistances R30, R31 are coupled to the base electrode of a transistor Q5 and between terminal P4 and output ports 12, 13 of regulator M2, thereby enabling regulator M2 to establish the bias voltage applied to the base electrode for switching the transistor between conducting and non-conducting modes according to the state of the duty cycle of regulator M2. Connection of the base electrode to output ports 12, 13 of regulator M2 enables the regulator to adjust the modulation of transistor Q5 over a range between approximately five and ninety-five percent of a cycle. A resistance R32 and a capacitance C20 are coupled between ports 6, 7 of regulator M2 to establish the operational frequency, $f_3$, of regulator stage 28. Adjustable resistance R2, together with resistances R33, R34, form a voltage divider establishing an adjustable reference voltage (across resistances R33 and R2) and a fixed reference voltage (across resistance R34) to ports 2, 16 of regulator M2 for establishing its duty cycle.

Transistor Q5 is, in effect, a chopper similar in its application to transistor Q1 in circuit 12, driven by regulator M2 to convert the direct current applied to terminal P5 into a continuous train of direct current pulses applied via node P22 to an inductance L2 in push-pull drive stage 30. Current flowing through inductance L2 is applied to a center tap P21 of primary winding W3 of step-up isolation transformer 32. A capacitance C22 is coupled across both ends of winding W3 to form a tuned resonant circuit. Together, capacitance C22 and transformer 32 form an equivalent resonant circuit which serves as a constant current oscillator with a resonant frequency $f_4$.

Current flows through the center tap of winding W3 and alternately (depending upon the instantaneous state of the resonant circuit) through each section of winding W3 and the corresponding collector and emitter electrodes of a pair of transistors Q6, Q7 coupled in a pushpull configuration across opposite ends of winding W3. A pair of zener diodes D10, D11 are coupled across the collector and emitter electrodes of transistors Q6, Q7, respectively, to protect them against transient spikes during switching. The base electrodes of transistors Q6, Q7 are coupled across a winding W12 of transformer 32. Bias voltages are applied to the base electrodes by two sections of winding W12 through a potential applied to center tap P23 from a current flowing from node P22, through a series resistance R36 and a capacitor C23 having one side connected to the network reference potential. A resistance R37 connects center tap P23 to a node P24 between resistance R36 and capacitance C23. Current flowing through primary winding W3 induces a current in winding W12 by transformer action. During each cycle of the oscillator, one of transistors Q6, Q7 is held in a non-conducting mode by the bias potential applied to its base electrode by the corresponding section of winding W12 while the other transistor is held in a conducting mode with current flowing through inductance L2 and across its collector and emitter electrodes via center tap P23 and a corresponding section of winding W3. Resistance R38 establishes a potential between the coupled emitter electrodes of transistors Q6, Q7 and the network reference potential while a diode D12 assures a unidirectional current flow through inductance L2 when transistor Q5 is in a conducting mode. A ratio of about 6:5 between the turns of primary and secondary windings W3, W4 will provide a sinusoidal output signal across terminals P1, P3 having a peak-to-peak amplitude of between zero and two volts, depending upon the duty cycle of regulator M2 established by the setting of resistance R2.

Transformer 32 has a third winding W13 wound in the same direction as windings W3 and W12, with a center tap P24 coupled directly to the network reference potential. A pair of diodes D13, D14 with common cathodes are coupled to opposite section of winding W13 between center tap P24 and a resistance R39 to provide full wave rectification of signals developed across winding W13. The voltage amplitude of these signals varies in response to changes in the output potential developed between terminals P1, P3 and is used to provide a feedback signal applied directly to port 1 of regulator M2 and, across a capacitance C24, to port 9 of regulator M2. The voltage developed between the feedback and reference signals is amplified and compared by an amplifier and error detection stage internal to regulator M2, to the fixed reference voltage provided by resistance R34. Variations between the amplified feedback signal and the fixed reference voltage are applied by circuitry internal to regulator M2 to automatically control its duty cycle and thereby regulate the amplitude of the voltage developed across output terminals P3, P1. A resistance R40, coupled in parallel with a zener diode D15 between resistance R39 and the network reference potential, divides the amplitude of the feedback signal developed across winding W13 to a level compatible with the operational characteristics of regulator M2. The amplitudes of voltages appearing across both collector electrodes of transistors Q6, Q7 have sinusoidal waveforms with a frequency equal to $f_4$. The turns ratio between windings W3 and W4 is selected to provide an output voltage between output terminals P1, P3 having a variation in amplitude of approximately two volts zero-to-peak.

Figure 5:
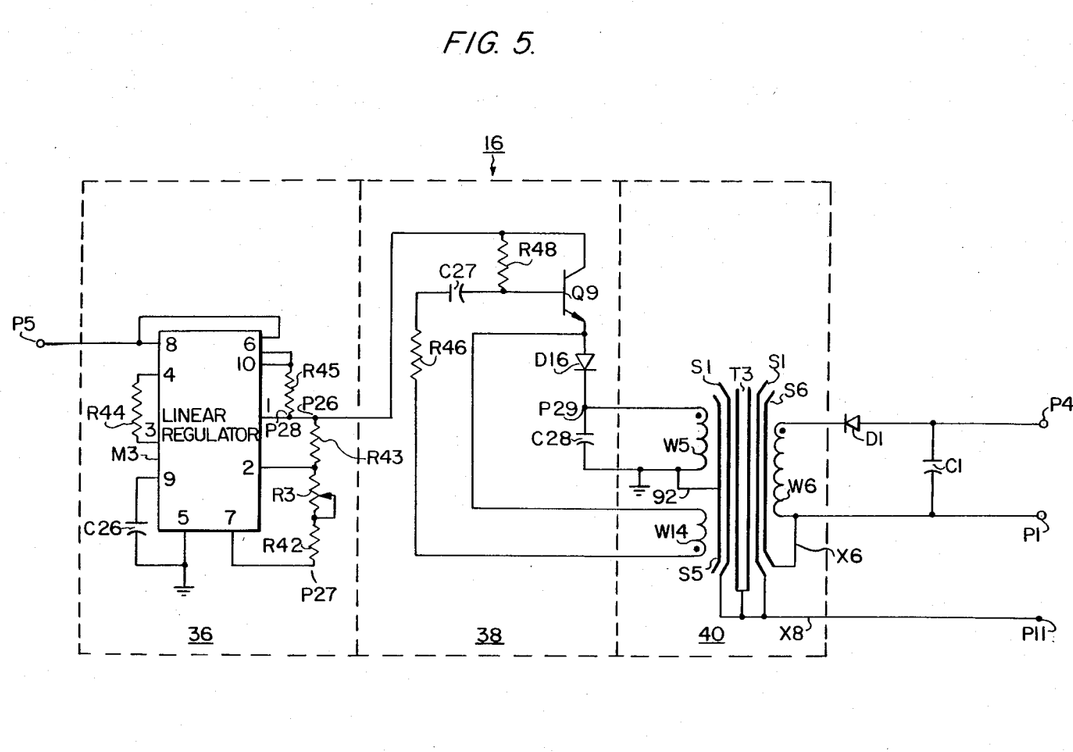
FIG. 5 is an electrical schematic diagram of a third circuit included in the embodiment of FIG. 1.

As shown in FIG. 5, circuit 16 includes a regulator stage 36 having a linear voltage regulator M3, such as a sixteen pin SG 1532 integrated circuit chip manufactured by Silicon General Company. Power is applied directly to ports $V_o$, 8 of regulator M3 via terminal P5. Regulator M3 has output ports 1, 7 coupled to nodes P26, P27 and a voltage divider formed by serially connected resistances M42, R3 and R43. In effect, regulator stage 36 operates as a variable impedance to dissipate a small amount of power which would otherwise be applied to oscillator 38. An adjustable reference voltage developed at a node P28 between adjustable resistance R3 and resistance R43 is applied to control port 2 of regulator M3 to enable its internal error detection circuitry to provide adjustment of the voltage supplied by regulator M3 at its port 1 to node P26. A capacitance C26 coupled between ports 5, 9 and a resistance R44 coupled between ports 3, 4 established reference potentials for the internal error detection circuitry of regulator M3. A resistance M45 coupled between node P26 and ports 6, 10 enables internal current limiting circuitry of regulator M3 to automatically adjust the voltage on terminal P26 in response to changes in current flow through terminal P26.

Drive stage 38 includes a transistor Q9 coupled between regulator 36 and transformer 40 to serve as a chopper to periodically interrupt current flow between regulator 36 and transformer 40. Regulator M3 provides a substantially constant voltage via node P26 to the collector electrode of transistor Q9. A bias potential is applied to the base electrode of transistor Q9 by a resistance R46 serially coupled with a capacitance C27 between the base electrode and node P27. The emitter electrode is connected via diode D16 to a node P29. A large capacitance C28, coupled in parallel with primary winding W5 of transformer 40, between node P29 and the network reference potential, forms a circuit having a resonant frequency, $f_5$. The emitter electrode is also connected to one side of a winding W14 which is oppositely poled to that of winding W5; the other side of winding W14 is connected to resistance R46. A resistance R48 is coupled between the collector and base electrode to provide sufficient voltage to bias transistor Q9 into a conducting mode to provide for cyclical recharging of capacitance C28 to its peak resonance voltage. During operation, current flows cyclically in alternate directions between capacitance C28 and winding W5. When the voltage across capacitance C28 reaches a peak value, the voltage induced in winding W14 provides a base bias voltage for transistor Q9 through resistance R46 and capacitor C27 to enable current to flow between the collector and emitter electrodes.

When the voltage across capacitance C28 falls to a minimum at the end of each half cycle, the polarity of current through winding W14 causes the bias voltage on the base electrode to hold the collector and emitter electrodes in a non-conducting stage, thereby permitting current flowing from winding W5 to re-charge capacitance C28 to its peak voltage. In effect, oscillator 38 and transformer 40 from a Hartley oscillator providing a sinusoidal output signal across winding W6. With a step-up turns ratio of 1:12.5 between windings W5 and W6, and a constant potential of fifteen volts applied between terminal P5 and the network reference potential, circuit 16 provides a half-wave rectified voltage between output terminals P4, P1 having an amplitude which may be varied (by adjusting resistance R3) between approximately eighty and one hundred and fifty volts. The amount of ripple occurring between terminals P4, P1 is principally due to the half-wave rectification. Maintenance of the high voltage between terminals P1, P2 limits the amount of the ripple occurring on terminal P4 to less than one percent of the voltage occurring between terminals P4, P1.

The construction of transformers 24, 32 and 40 is generally described in the afore-identified copending application entitled "High Voltage Isolation Transformer". As constructed, these transformers are compact, have low loss closed cores T1, T2, T3, respectively, made of a magnetic material such as a ceramic ferrite, and electrically isolate the several tens of kilovolts applied between output terminal P1 and the network reference potential from the other stages of circuits 14, 16. The primary winding W1 of transformer 24 is wound around an annular spool insulator $A_1$ and secondary winding W2 is wound around a similar insulator $B_1$, as shown in FIG. 1. In transformer 32, windings W3, W12 and W13 are wound in the same direction around spool insulator A2 and secondary winding W4 is wound around insulator B2, while in transformer 40, windings W5 and W14 are wound in opposite directions on insulator A3 and winding W6 is wound on insulator B3. Spool insulators A1, A2, A3, B1, B2 and B3 have axial bores lined with discrete coatings S1 of an electrically conducting material exhibiting a lower electrical conductivity than the conductors of which the transformer windings are made. The spool insulators are mounted upon opposite legs of their respective transformer cores.

Windings Q1, W3, W12, W13, W4, W5, W14, and W6 are each encased in similar, but discrete coatings of the electrically conducting material: coating S2 encases primary winding W1; coating S3 encases windings W3, W12 and W13; coating S4 encases secondary winding W4; coating S5 encases windings W5 and W14; and coating S6 encases winding W6. Coatings S1 through S6 are in intimate adhesive contact with the underlying surfaces of the corresponding insulating spools; coatings S2 through S6 also completely encase and thus physically separate the respective windings from the other parts of transformers 24, 32, 40.

As shown in FIG. 2, a lead X1 in transformer 24 extending from coating S1 lining the axial bore of insulator A1, couples coating S1 to core T1 and terminal P10 while a lead X2 couples coating S2 to terminal P9. As shown in FIG. 4, in transformer 32, a lead X3 couples coating S3 to center tap P21 and a lead X4 couples coating S4 to terminal P1. As shown in FIG. 5, in transformer 40, a lead X5 couples coating S5 to one side of winding W5 and the network reference potential while a lead X6 couples coating S6 to terminal P11. A lead X7 couples coatings S1 lining the axial bores of insulators A2, B2 to core T2 and terminal P10, while a lead X8 couples coatings S1 lining the axial bores of insulators A3, B3 to core T3 and terminal P10. The connections between coatings S2 through S6 and the corresponding encased windings assure that any potential differences between the windings and their respective coatings are minimized in amplitude, thereby avoiding sparking between the windings and their coatings. The coupling between coatings S1, the corresponding cores T1, T2, T3, and terminal P10 eliminates the possibility of sparking within the axial bores of the insulating spools while maintaining a potential difference between the cores and the network reference potential which is approximately one-half of the potential difference between the corresponding primary and secondary windings.

The power supply disclosed is suitable for construction as a very compact, light weight, efficient network which may be continuously powered for several hours by a small direct current source such as a dry cell battery. One battery powered embodiment, for example, drew approximately eight watts of power and, exclusive of the battery, was able to be housed in a container of about one hundred and twenty-eight cubic inches. Moreover, by having regulator stages 20, 28 operated at frequencies on the order of fifty to sixty kilo-Hertz to drive oscillators having resonant frequencies on the order of fifteen to thirty kilo-Hertz (i.e., the ratio between pulse repetition frequency in a regulator stage and the corresponding oscillator may be between 2:1 and 10:1), the network is able to rely upon the oscillators to attenuate harmonic frequencies of signals generated by the regulator stages and thereby provide well regulated output signals without requiring substantial filter stages. Furthermore, the use of two, parallel voltage multiplier stages coupled across a step-up transformer provides an extremely large multiplication of the potential difference applied across the transformer with a minimal number of components and a concomitant saving of power.

We claim:

1. A high voltage power supply providing a plurality of concurrent output signals, comprising:
   input terminal means (P5) for providing energization potential from a unidirectional source;
   output terminal means (P1) for providing a common reference for each of the plurality of concurrent output signals;
   a first voltage generating circuit (12) comprising:
   first oscillator circuit means (22) having a first tuned network including first transformer (46), for developing a first sinusoidal signal at the resonant frequency of said first tuned network.
   first regulator circuit means (20) for developing pulses at a particular repetition rate and duty cycle, for controlling the amplitude of said sinusoidal signal by interrupting the flow of energization potential to said oscillator circuit means from said input terminal means, second transformer means (24) for significantly increasing the amplitude of said sinusoidal signal, and voltage multiplier and rectifier circuit means (76, 76') including a second output terminal (P2), coupled to said second transformer means (24) for developing a unidirectional output voltage of several tens of kilovolts amplitude across said common output terminal means (P1) and said second output terminal (P2);

a second voltage generating circuit (14) comprising:

second oscillator circuit means (30) having a second tuned network including a third output terminal (P3) and third transformer means (32) for developing a second sinusoidal signal at the resonant frequency of said tuned network floating at said unidirectional output voltage across said common output means (P1) and said third output terminal (P3), second regulator circuit means (28) for developing pulses at a particular repetition rate and duty cycle for controlling the amplitude of said second sinusoidal signal by interrupting the flow of energizing potential to said second oscillator circuit means from said input terminal means; and a third voltage generating circuit (16) comprising:

third oscillator circuit means (38) having a third tuned network including fourth transformer means (40), for developing a third sinusoidal signal at the resonant frequency of said third tuned network, third regulator circuit means (36) for controlling the amplitude of said third sinusoidal signal by varying the magnitude of the flow of energizing potential from said input terminal means (P5) to said third oscillator circuit means, and rectifier circuit means (D.C.) for converting said third sinusoidal signal into a unidirectional output signal of an amplitude varying slightly from that of said unidirectional output voltage across said first output terminal means (P1) and a fourth output terminal (P4).

2. The power supply of claim 1 wherein the pulse repetition rate of each of said first and second regulator circuit means (20, 28) is at least twice the resonant frequency of each of said tuned networks of their respective voltage generating circuits.

3. The power supply of claim 2 wherein each of said first and second oscillator circuit means comprises a push-pull constant current oscillator.

4. The power supply of claim 2 wherein each of said first and second regulator circuit means (20, 28) includes means (R1, R2) for individually establishing the particular duty cycle of the pulses developed by each of said first and second regulator circuit means.

5. The power supply of claim 2 wherein each of said first and second regulator circuit means (20, 28) comprises a switching type regulator.

6. The power supply of claim 2 wherein said third regulator circuit means (36) comprises a linear impedance type regulator.

7. The power supply of claim 2 wherein each of said first, third and fourth transformer means (46, 32, 40) includes a single secondary winding (W9, W4, W6) and at least one primary winding coupled across a capacitive reactance (C3, C22, C28) to form respective ones of said tuned networks.

8. The power supply of claim 7 wherein at least said third and fourth transformer means (40, 32) are constructed to exhibit a significantly high electrical insulation between their primary and secondary windings.

9. The power supply of claim 2 wherein said voltage multiplier and rectifier circuit means (76, 76) comprise complementary pairs of multiple units of diodes and capacitors and said complementary pairs are parallel coupled across said common output terminal means (P1) and said second output terminal (P2).

10. The power supply of claim 2 wherein each of said first, second and third voltage generating circuits (12, 14, 16) further comprises circuit means which include a sense winding (W10, W13, W14) on each of said second, third and fourth transformer means for providing a feedback signal indicative of a variation in the amplitude of the output voltage across the output terminals of each of said voltage generating circuits to adjust the operation of each of said first, second and third regulator circuit means thereby to vary the amplitude of the sinusoidal signal developed by each of said oscillator circuit means (22, 30, 38).

11. The power supply of claim 10 wherein said first voltage generating circuit (12) further comprises circuit means (D2, D8, Q4, R-20-23) to which the feedback signal is applied for terminating the development of a sinusoidal signal by said first oscillator circuit means (22) in response to a substantial load curent drain across the output terminals (P1, P2) of said first voltage generating circuit.

12. A high voltage power supply providing a plurality of concurrent high voltage output signals, comprising:

a first circuit (12) having a pair of input ports connectable across a source (18) of electrical energy, comprising:

first regulating means (20) coupled to said input ports and having a first intermediate terminal (P7), for inverting said electrical energy into a first train of pulses characterized by a first pulse frequency and a first average amplitude, said first regulating means including first means (R1) for varying said first average amplitude;

first oscillator means (22) including a first resonant circuit exhibiting a first resonant frequency connected to said first intermediate terminal, for transforming said first train of pulses into a first sinusoidal signal having a peak-to-peak amplitude exceeding said first average amplitude;

first transformer means (24) having a primary winding (W1) coupled to receive said first sinusoidal signal, and a secondary winding (W2), for amplifying said first sinusoidal signal; and first and second rectifying means (76, 76') having opposite polarities and collectively providing a common terminal (P1) and a reference terminal (P2), additively coupled in parallel across said secondary winding of said first transformer means for rectifying said amplified first sinusoidal signal and for multiplying the amplitude of said second sinusoidal signal to provide a substantially constant high voltage signal across said first pair of output terminals;

a second circuit (14) having a pair of input ports connectable across said source, comprising:

second regulating means (28) coupled to said input ports and having a second intermediate terminal (P22), for inverting said electrical energy into a second train of pulses characterized by a second pulse frequency and a second average amplitude, said second regulating means including second means (R2) for varying said second average amplitude;

second oscillator means including: second transformer means (32) having a secondary winding (W4) providing at one end a first output terminal (P3) and coupled at its other end to said common terminal and a center-tapped primary winding (W3), for inducing a second sinusoidal signal across said secondary winding (W4); first reactive means (C22) coupled across said primary winding (W3) to form a second resonant circuit with said second transformer means; second reactive means (L2) coupled between said second intermediate terminal and said center tap; and first switching means (30) having a pair of alternately conducting switching devices (Q6, Q7) connected between said second intermediate terminal and different ends of said primary winding (W3) for cyclically providing paths of current flow from alternate of said different ends of said primary winding (W3); a third circuit having a pair of input ports connectable across said source, comprising:

third regulating means (36) interposed between said input ports and an intermediate terminal (P26) for providing an intermediate potential difference between said intermediate terminal and said reference terminal, said third regulating means including third means (R3) for varying the amplitude of said intermediate potential difference;

second oscillator means including: third transformer means (40) having a second winding (W6) and a primary winding (W5) for inducing an alternating signal across said secondary winding; third reactive means (C28) coupled across said primary winding (W5) to form a third resonant circuit with said third transformer means; and switching means (Q9) coupled to said intermediate terminal for cyclically coupling said intermediate terminal to one end of said primary winding (W5); and means (D1, C1) providing at one end a second output terminal (P4) and coupled at its other end to said common terminal, for converting said alternating signal into an output signal having an amplitude varying from the amplitude of said high voltage signal between said reference terminal and said second output terminal.

13. The power supply of claim 12 wherein said second and third transformer means comprise:

core means (T2, T3) each including pairs of legs, for concentrating lines of magnetic flux in ferromagnetic paths within said core means;

a plurality of electrically insulating means (A2, B2, A3, B3) each encircling different ones of said legs;

a first and equal plurality of coatings (S1) of an electrically conducting material exhibiting a first electrical conductivity completely covering the surface areas of different ones of said insulating means adjacent to said core means; and means (X7, X8) for interconnecting said core means and said first plurality of coatings to one side of said secondary winding of said first transformer means.

14. The power supply of claim 13 wherein said primary (W3, W5) and said secondary (W4, W6) windings of said second and third transformer means have a second and greater electrical conductivity and are wound around different ones of said insulating means to generate a magnetic flux in corresponding ones of said core means, further comprising a second plurality of coatings (S3, S4, S5, S6) of said electrically conducting material for separating and completely surrounding different ones of said primary and secondary windings and lining the surface areas of corresponding ones of said insulating means adjacent to said windings.

15. The power supply of claim 14 wherein each of said second plurality of coatings are separately coupled to corresponding ones of said primary and secondary windings.

16. A high voltage power supply providing a plurality of concurrent output signals, comprising:

first (20) and second (28) regulator stages each having a pair of input ports connectable across a source of electrical energy, each providing a separate intermediate terminal (P7/P22), each inverting said electrical energy into separate trains of pulses characterized by average amplitudes and respective first and second operational frequencies, and each of said regulator stages including separate impedance means (R1/R2) for independently varying the duty cycle of a corresponding one of said regulator stages and thereby changing said average amplitude of the corresponding one of said trains of pulses;

first and second oscillator stages (22/30+32) each including respective ones of a first and second reactive impedance (L1/L2) separately coupled to corresponding ones of said intermediate terminals, first and second transformer means (46/32) each having a secondary winding (W9/W4) and a primary winding (W7/W3) having a center tap (P6/P21) connected to said corresponding ones of said intermediate terminals via one of said first and second reactive impedances for inducing first and second sinesoidal signals across corresponding ones of said secondary windings, third and fourth reactive impedances (C3/C22) forming first and second resonant circuits exhibiting respective first and second resonant frequencies with respective ones of said transformer means, said first and second operational frequencies being greater in value than corresponding of said first and second resonant frequencies, and first and second switching means (22/30) having a pair of alternately conducting switching devices (Q2, Q3/Q6, Q7) connected between said intermediate terminal and different ends of a corresponding one of said primary windings (W7/W3);

third transformer means (24) having a secondary winding (W2) and a primary winding (W1), coupled to said first transformer means (46) and providing a step-up relation to said secondary winding (W2), for transforming said first sinusoidal signal into a third sinusoidal signal;

first (76) and second (76′) complementary voltage multiplier stages additively coupled in parallel across said secondary winding of said third transformer means, having a common terminal (P1) and a reference terminal (P2) forming a first pair of output terminals, and providing an output voltage having an amplitude on the order of several tens of kilovolts at said common terminal, said common terminal being coupled to one side of said secondary winding of said second transformer means;

a third regulator stage (36) having a pair of input ports connectable across said source of electrical energy and providing an intermediate potential difference, said third regulator stage including means (R3) for varying the amplitude of said intermediate potential difference;

third oscillator stage (38+40) including fourth transformer means (40) having a primary (W5) and a secondary (W6) winding, a fifth reactive impedance (C28) forming a third resonant circuit with said fourth transformer means, and third switching means (Q9) connected to said third resonant circuit coupled between said third regulator stage and said third resonant circuit for cyclically applying said intermediate potential difference to said third resonant circuit; one side of said secondary winding (W6) of said fourth transformer means being connected to said common terminal;

said second and fourth transformer means having cores of magnetic material electrically coupled to one side of said secondary winding of said third transformer means; and means (D1, C1) coupled to said secondary winding of said fourth transformer means for converting a signal occurring across said secondary winding into an output signal having an amplitude differing from the amplitude of said output voltage.

17. The power supply of claim 16 wherein said first and second operational frequencies are greater than respective ones of said first and second resonant frequencies by at least a factor of two.

18. The power supply of claim 17, further comprising circuit means which include a sense winding (W10, W13, W14) on each of said first, second and forth transformer means for providing a feedback signal indicative of a variation in the amplitude of the output voltage across said secondary windings of each of said first, second and fourth transformer means to adjust the operation of each of said first, second and third regulator stages and thereby vary the amplitude of the sinusoidal signal developed by each of said oscillator stages.

* * * * *